P. ESTES.
Boiler for Steam-Heaters.

No. 134,044. Patented Dec. 17, 1872.

Witnesses:
G. Mathus
Colon C. Kemon

Inventor:
Philip Estes
per
Attorneys.

UNITED STATES PATENT OFFICE.

PHILIP ESTES, OF LEAVENWORTH, KANSAS.

IMPROVEMENT IN BOILERS FOR STEAM-HEATERS.

Specification forming part of Letters Patent No. 134,044, dated December 17, 1872.

*To all whom it may concern:*

Be it known that I, PHILIP ESTES, of Leavenworth, in the county of Leavenworth and State of Kansas, have invented a Vertical Boiler, of which the following is a specification:

The invention relates to a vertical boiler more especially designed for heating hot-houses or other buildings with hot water. It consists, first, in constructing the boiler and furnace proper in three easily-detachable sections, whereby the commonest mechanic can take it apart, clean, and again put it together. It consists, secondly, in providing the crown-sheet with cups and circulatory tubes that hang down in the fire-chamber, to facilitate the heating operation.

Figure 1:
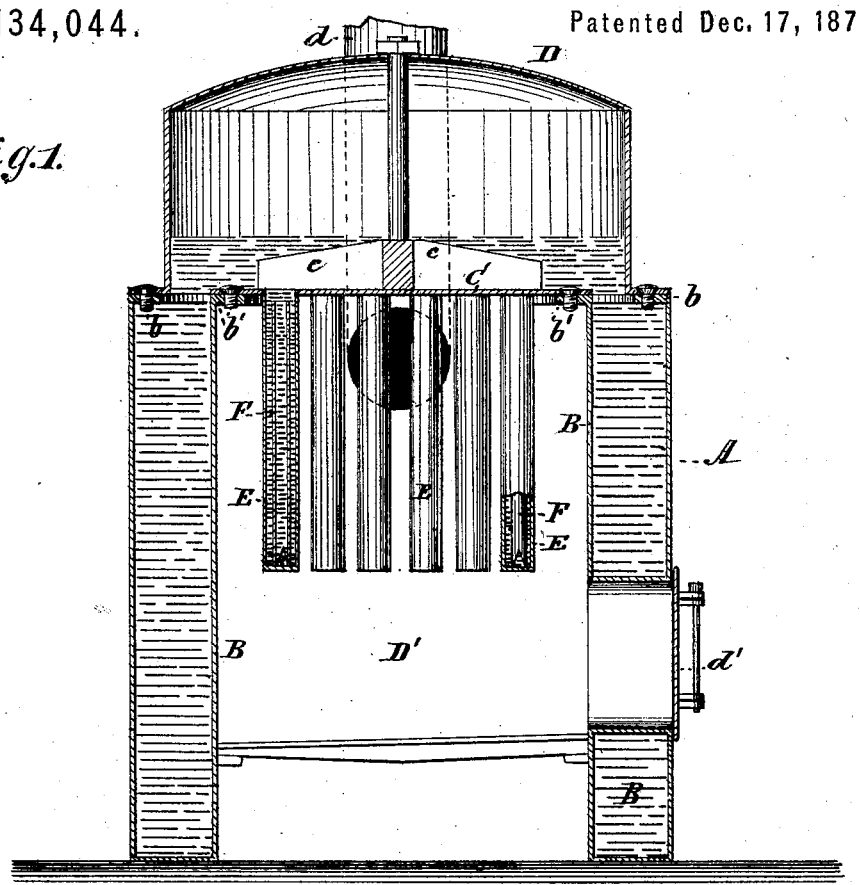
Figure 2:
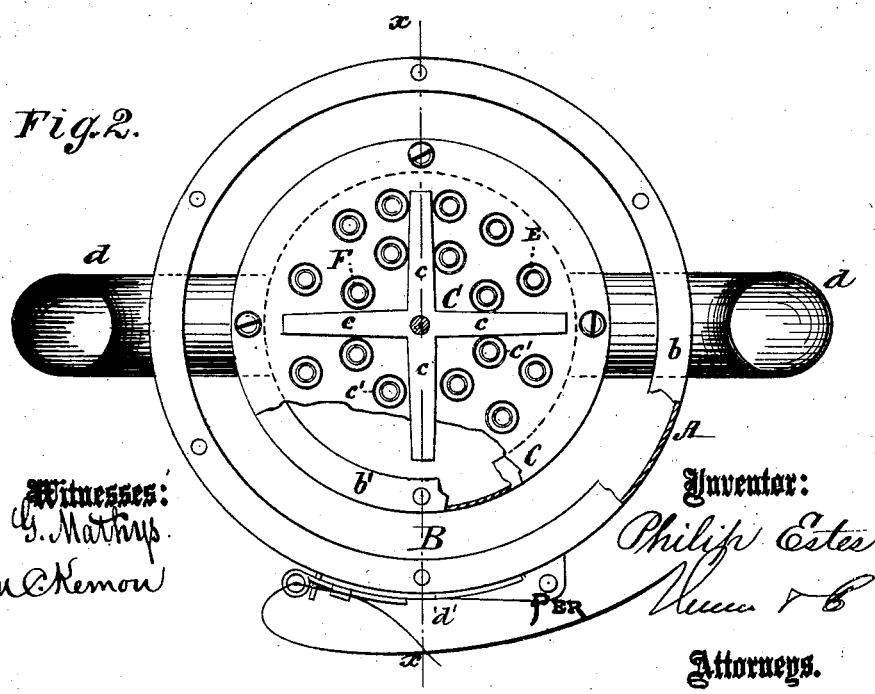

In the drawing, Figure 1 is a vertical section through line $x\ x$ of Fig. 2, and Fig. 2 is a top view with the dome removed.

A represents the boiler, cast in three sections—namely, the water-chamber B, the crown-sheet C, and the dome D. These parts are bolted or fastened together so as to be readily separated. The water-chamber B surrounds the furnace-chamber D′, has smoke-flues $d$ and doors $d'$ leading thereinto, and has two inner flanges, $b\ b'$, on top. The dome D is also provided with an outer flange on bottom, whereby it is easily bolted to the flange $b$ of water and furnace chambers. The crown-sheet C is also bolted to the other flange $b'$, has two diagonal ribs, $c\ c$, on top, and has perforations $c'$. To the under side of this crown-sheet are attached cups E, which hang down in close proximity to the fire, and in them are loosely placed inner tubes F, of sheet-iron, forked at bottom. The purpose of this is to secure a circulation and prevent the accumulation of sediment.

A boiler constructed in this manner has been practically tested by me at a pressure of two hundred and twenty-five pounds.

Having thus described my invention, what I claim as new, and desire to secure by Letters Patent, is—

1. An upright heater having the water-chamber B, crown-sheet C, and dome D in separate and independent sections, constructed so as to be attached together in the manner described.

2. The crown-sheet C having cups E pendent in the fire-chamber and surrounding loose internal tubes F, as and for the purpose described.

PHILIP ESTES.

Witnesses:
 ED. RUSSELL,
 D. W. THOMAS.